United States Patent [19]

Hess

[11] E Patent Number: Re. 32,685

[45] Reissued Date of Patent: May 31, 1988

[54] DOUBLE FLOW REHEAT DIAPHRAGM

[75] Inventor: John M. Hess, Scotia, N.Y.

[73] Assignee: General Electric Company, Schenectady, N.Y.

[21] Appl. No.: 579,468

[22] Filed: Feb. 13, 1984

Related U.S. Patent Documents

Reissue of:

[64] Patent No.: 4,392,778
Issued: Jul. 12, 1983
Appl. No.: 249,894
Filed: Apr. 1, 1981

[51] Int. Cl.[4] ..... F01D 9/04

[52] U.S. Cl. ..... 415/139; 415/217

[58] Field of Search ..... 415/77–79, 415/101–103, 134–139, 193, 180, 216–218, 219 R, 118; 416/179, 198 A, 198 R

[56] References Cited

U.S. PATENT DOCUMENTS

| | | | |
|---|---|---|---|
| 1,267,229 | 5/1918 | Junggren | 416/198 A |
| 2,102,416 | 12/1937 | Junggren | 415/103 |
| 2,945,290 | 7/1960 | Walsh | 415/218 X |
| 3,529,901 | 9/1970 | Hart et al. | 415/138 X |
| 3,817,654 | 6/1974 | Sohma | 415/103 |
| 4,029,432 | 6/1977 | Meylan et al. | 415/101 |
| 4,078,812 | 3/1978 | Beckershoff | 415/139 |

FOREIGN PATENT DOCUMENTS

| | | | |
|---|---|---|---|
| 2151661 | 4/1973 | Fed. Rep. of Germany | 415/118 |
| 362093 | 7/1962 | Switzerland | 415/103 |
| 227457 | 3/1925 | United Kingdom | 415/217 |
| 1028554 | 5/1966 | United Kingdom | 416/198 A |
| 2001139 | 1/1979 | United Kingdom | 415/218 |

*Primary Examiner*—Robert E. Garrett
*Assistant Examiner*—Joseph M. Pitko

[57] ABSTRACT

In a double flow section of a steam turbine, the inner web of the diaphragm surrounding the rotor shaft in the region of divergence of the steam flow paths, is fabricated in the form of two cylindrical shells which are held together either in a fixed position or in a relatively fixed position which permits some slight axial motion between the shells. This form of diaphragm eliminates a number of machining and fabrication alignment problems and additionally permits differential axial expansion of the two pieces occurring as a result of internal thermal steam conditions.

12 Claims, 2 Drawing Sheets

DOUBLE FLOW REHEAT DIAPHRAGM

Matter enclosed in heavy brackets [ ] appears in the original patent but forms no part of this reissue specification; matter printed in italics indicates the additions made by reissue.

BACKGROUND OF THE INVENTION

This invention relates to steam turbines and in particular to double flow steam turbines.

In general, steam turbines operate to convert energy stored in high-pressure, high-temperature steam into rotational mechanical movement. The steam turbines employed by electric utilities in the generation of electric power, typically comprise a plurality of turbine buckets radially mounted on a rotor shaft and disposed so as to form a plurality of bucket wheels. The rotor shaft, with its bucket wheels, is mounted on bearings with the bucket wheels disposed inside an inner shell which is in turn surrounded by an outer shell. These double shells serve the function of forming a pressurizable housing in which the bucket wheels rotate and of preventing potentially damaging thermal gradients. The bucket wheels are disposed between stationary nozzle rings. These nozzle rings are formed by circular arrays of stationary curved partitions. These partitions are generally referred to as nozzle partitions and the spaces between the partitions as nozzles. As steam passes through the pressurizable inner shell it alternately passes through sequences of stationary nozzle partitions and rotating turbine bucket wheels to produce rotational movement of the rotor shaft. These concepts are elementary and are generally well known in the turbine arts.

Modern large steam turbines generally comprise several sections such as high-pressure section, intermediate pressure section and low-pressure sections. These sections possess various design characteristics so as to permit the extraction of the largest possible amount of energy from the expansion of steam through the turbine sections. It is a common practice to have one or more of these sections configured in a double flow arrangement, in which steam entering a middle portion of the section encounters a diverging flow path. Following entry into this middle portion of one of the turbine sections, the steam exits in opposite directions with both flows directed to rotate the turbine shaft in the same direction. Thus for example, steam entering from the top or bottom exits toward the left and right. This double flow configuration contributes to the overall machine efficiency.

One of the important parts of a double flow turbine section is the inner web of the diaphragm. Before the steam flowing in opposite directions encounters any turbine bucket wheels, it encounters a first set of nozzle partitions which direct the steam against the turbine buckets at optimal angles. There are two sets of these nozzle partitions, each arranged in an annular spoked pattern on opposite sides of the middle (that is, steam entrance) portion of the double flow turbine diaphragm. Along their radially outward tips, these partitions are affixed to, as by welding, outer annular rings which are fitted into recesses within the inner turbine shell. Of greater interest in the present invention, however, is the fact that along the radially inner portion of these nozzle partitions, they are affixed to the inner web of the diaphragm, again typically by welding. Thus this inner web has two sets of annularly configured nozzle partitions affixed to it (one on each end of the diaphragm). Its primary function is to support this particular set of nozzle partitions. These are the first nozzle-defining partitions encountered in the steam flow path of the particular double flow section under consideration. The remaining nozzle partitions are disposed between the rotating turbine bucket wheels using differently configured diaphragms. In addition to supporting these first rings of nozzle partitions, the inner web also serves another important function, in that it significantly helps to define the steam flow path. In particular it prevents direct contact between the incoming steam and the rotor shaft. The design of this web ensures that the entire steam flow is directed between the nozzle partitions and thence to the turbine bucket wheels.

In previous designs of this inner web, single piece fabrication was employed. However, this design can be difficult to implement in practice. In particular it may be difficult to keep two individual steam path assemblies flat, parallel, circumferentially aligned and properly axially spaced during the thermal distortions inherent during weld fabrication. Moreover, during machining, both ends of the web have to be concentrically aligned, joint pitches must be aligned, and steam paths machined separately and leveled. As a result of accumulated variances in machining, assembly and distortion in welding, rework is often required to assure that all dimensions are satisfactory. In one proposed solution to this problem the inner web is fabricated in two axial pieces bolted together at the midline. While being an improvement over the single piece design for low-temperature applications, this bolted-together-web design is undesirable in high-temperature applications. In addition, neither the single piece nor the bolted-together design permit relative axial movement due to transient or steady-state thermal expansion forces.

SUMMARY OF THE INVENTION

In accordance with a preferred embodiment of the present invention an inner web of a diaphragm for use in a double flow section of a steam turbine comprises a first cylindrical shell formed in two joinable halves and a second cylindrical shell also formed in two joinable halves for surrounding an end of the first shell which surrounds the turbine rotor shaft. More particularly, the inner web of the present invention comprises a means for holding the second shell in a relatively fixed position around the first shell while permitting limited axial motion between the shells. Furthermore, the first shell possesses a surface to which the first ring of nozzle partitions of the steam turbine are attached. Likewise, the second shell possesses a similar surface for like attachment of the first ring of nozzle partitions in the opposite steam flow direction. In a preferred embodiment of the present invention the first and second shells are joined together by means of a rabbet joint; in another embodiment they are held together by a hook fit. Lest confusion arise it should be noted that the first and second shells discussed herein are distinct from the inner and outer pressurizable shells mentioned above.

In another embodiment of the present invention the second cylindrical shell is bolted onto one end of the first shell. While this embodiment does not permit axial movement, it is nonetheless much simpler to fabricate since all distortion from welding the partitions onto the shells is easily compensated for.

Accordingly, it is an object of the present invention to provide a two-piece inner web for use in a double flow steam turbine.

It is a further object of the present invention to provide an inner web in which fabrication of each portion occurs separately so as to permit precise machining of both portions independently.

It is also an object of the present invention to provide limited flexibility in dimensioning at the rabbet fit; this permits limited differential expansion between the first and second shell portions without distortion of the diaphragm.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DETAILED DESCRIPTION OF THE INVENTION

Figure 1:
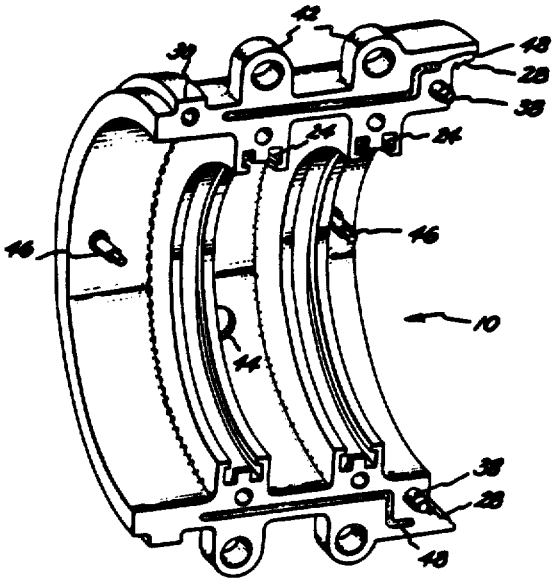
FIG. 1 is an isometric view illustrating one half of a first cylindrical shell portion of the inner web in accordance with the present invention.
Figure 2:
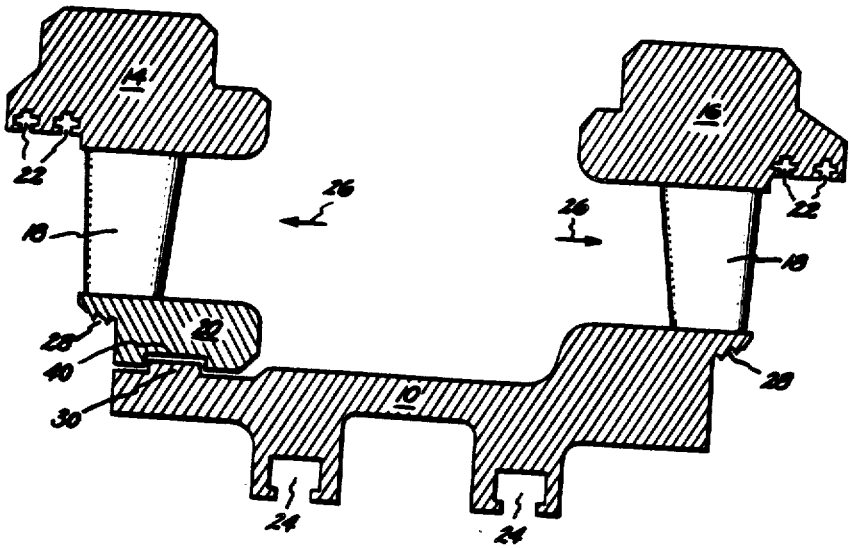
FIG. 2 is a partial cross-sectional diagram of the inner web of the present invention shown in place relative to other turbine components.

FIG. 1 shows one of four separable pieces of the present invention. In particular there is shown an isometric view of one of the halves of a first cylindrical shell forming the major part of the structure of the invention. This cylindrical shell is not to be confused with the inner and outer pressurizable shells surrounding the entire turbine assembly. The first cylindrical shell in particular possesses lip 30 which meets with a corresponding recess in the second cylindrical shell of the present invention. Both the first and second cylindrical shells are formed in two halves (hence, the four pieces to the structure). The first cylindrical shell possesses halves which are joined together to surround the turbine rotor shaft. The second shell (not seen in FIG. 1) comprises two halves which are joined about lip 30 to surround the first shell, as indicated in FIG. 2. Shell half 10 also possesses pegs 38 to assist in alignment of the two shell halves. Pegs 38 fit into alignment holes on the other half of the first shell. Shell half 10 also possesses a raised key portion 48 which serves a further alignment function and also a sealing function. The raised portion 48 mates with a corresponding key slot recess in the other first shell half. To facilitate joining of the shell halves, each shell half possesses bosses 42 with holes therein for receiving bolts which join the two halves of the first shell. Additionally, the first cylindrical shell of the present invention possesses circular grooves 24 along the inner circumference thereof for insertion of steam packing seal material which is disposed in the two circular grooves so that the shell halves are spaced apart, by a predetermined clearance, from the rotor shaft. Typically this clearance is 30 to 40 mils. At least one of the shell halves possesses aperture 44 through a large metal boss which is typically cast as part of the shell. This serves several functions. First, it provides a passage for the introduction of somewhat lower temperature steam for rotor cooling during normal operation. Second, it provides a passage for steam which performs a prewarming function for the turbine so as to reduce thermal stress. Third, the aperture 44 may be employed as an access hole through which entry to the rotor shaft is gained. In particular, it is desirable to install rotor balancing weights, if needed, in holes along that portion of the rotor shaft which rotates beneath this aperture. This facilitates rotor balancing. Thermocouples 46 may be positioned on the first shell as shown to provide accurate indications of steam temperature.

Figure 3:
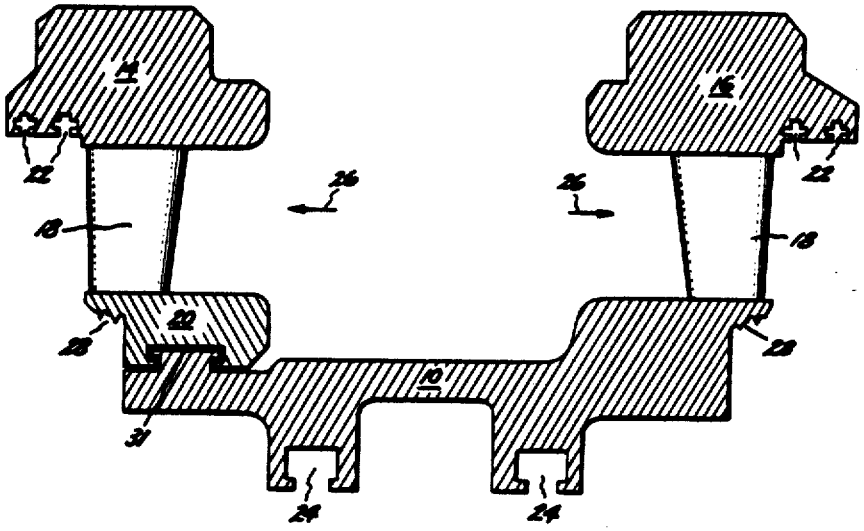
FIG. 3 is similar to FIG. 2 except that one form of hook-fit joint is shown.
Figure 4:
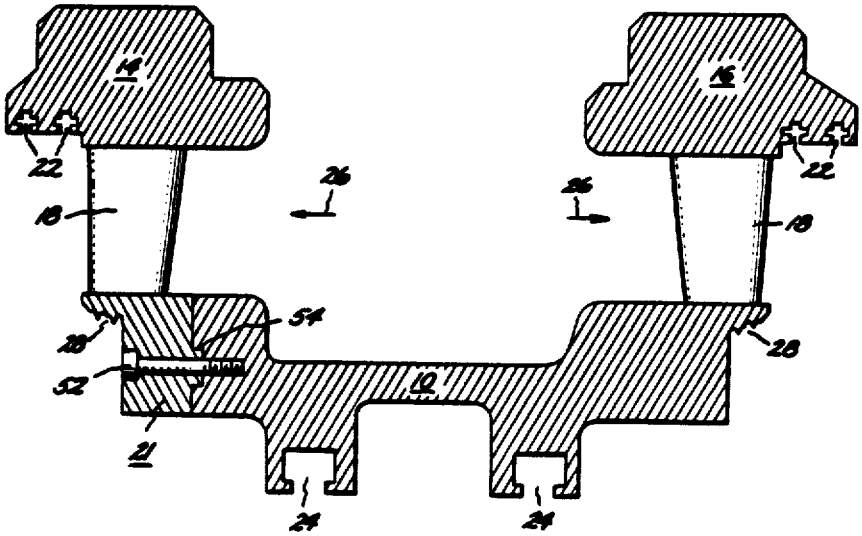
FIG. 4 is similar to FIG. 2 but shows an embodiment of the present invention which does not exhibit axial expansion.

FIG. 2 illustrates the inner web of the present invention comprising first and second shells 10 and 20 respectively. Shells or inner webs 10 and 20 are shown in relation to curved nozzle partitions 18 and outer annular rings 14 and 16 which are fitted into recesses in the inner pressurizable turbine shell. A first end of shell 10 has an outer peripheral surface to which is attached nozzle partition 18 as illustrated in FIG. 2. A second end of shell 10 is displaced along the axis of the rotor shaft from the first end and is surrounded by shell 20 as is shown in the drawings. Shells 10 and 20 are held together by a joint or means which permits limited axial movement between the shells. The outer peripheral surface of shell 20 is attached to another nozzle partition 18 and outer rings 14 and 16 are affixed to both nozzle partitions 18 as illustrated in FIG. 2. Outer rings 14 and 16 typically possess slots 22 for the insertion of tip spill strips which are set at a specified radial clearance from the turbine rotor wheels. An important aspect of this embodiment of the present invention is the fact that the inner web comprising shells 10 and 20 is a two-part structure possessing a joint which permits limited axial movement. The joint or means which holds shell 20 in a relatively fixed position around one end of shell 10 is illustrated in FIGS. 2, 3 and 4. This joint preferably comprises a rabbet joint as indicated by lip 30 in first shell 10 and recess 40 in second shell 20. As described above, the two nozzle partitions 18 are axially displaced and join outer ring 14 to shell 20 and outer ring 16 to shell 10, as shown. The steam flow direction through these nozzles is generally indicated by arrows 26. Shells 10 and 20 also preferably possess root spill strips 28 which are spaced apart from a radially inner portion of the turbine buckets.

The inner web of the present invention preferably comprises a material such as steel and in particular high-temperature alloys of steel. An important aspect of this invention is that the material is machined to produce lip 30 and recess 40 so as to form the preferred rabbet joint. Other joints such as hook-fit joint may also be employed as shown in FIG. 3. In the case of the rabbet joint, the spacing between the vertical faces of the rabbet joint are typically set at approximately 5 mils with a slightly larger spacing being desired for the left-most vertical joint face in FIG. 2.

FIG. 3 illustrates one embodiment of the present invention in which double hook joint 31 is employed to join the first and second shells. A single hook-fit joint may also be employed. Because of the extra machining involved in this form of joint, as compared with the straight rabbet joint, this is not the preferred embodiment of the present invention. This is also the case because assembly with this form of joint is more difficult and involves a sliding rotation of the pieces.

FIG. 4 illustrates an embodiment of the present invention in which the second shell 21 is bolted to the first shell 10. Even though this embodiment does not permit relative axial movement, it nonetheless permits an easier fabrication process in which nozzle partitions 18 are first affixed between ring 14 and shell 21 and between ring 16 and shell 10. Following this, circumferential rabbet joint 54 is machined into shells 21 and 10. It is here that distortion and alignment problems created by welding of partitions 18 are corrected. This latter advantage is also present in the embodiment shown in FIGS. 2 and 3 which possess the additional advantage of limited axial motion.

The diaphragm of the present invention is particularly useful in those situations in which reheat steam is employed. In particular, this diaphragm is also most advantageously employed in the reheat section of the turbine.

From the above it may be appreciated that the inner web of the diaphragm of the present invention provides a means for accurately and precisely supporting the first stage of nozzle ring partitions and for appropriately defining a portion of the steam flow path. In particular, the two-part construction of the diaphragm not only permits easy and accurate machining, but also produces a structure which permits a limited amount of axial movement to compensate for differential thermal expansion. This avoids warping or damage to the diaphragm. Many of the benefits of the present invention are obtained because its structure permits a fabrication process in which the joints are machined into the structure after completion of the fabrication process. It is at this stage that final alignment and mating of the first and second shells is accomplished.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. An inner web of a diaphragm for use in a double flow section of a steam turbine having a rotor shaft with a plurality of bucket wheels affixed thereto, said wheels [rotate] *rotatable* about the axis of said shaft between a plurality of stationary nozzle rings formed by curved partitions, said *inner* web comprising:

a first cylindrical shell formed in two joinable halves for surrounding a portion of said rotor shaft, [said first shell having at least two circular grooves along the inner periphery thereof for holding steam packing material in close proximity to said rotor shaft,] said first shell [also] having a surface around the outer periphery of a first end thereof for attachment of curved partitions;

a second cylindrical shell formed in two joinable halves for surrounding [the] *a* second end of said first shell, said second end being displaced along said axis from said first end, and said second shell [also] having a surface around the outer periphery thereof for attachment of curved partitions; and means for holding said second shell in a relatively fixed position around said first shell but permitting limited axial movement between said first and said second shell.

2. The web of claim 1 in which said holding means comprises a rabbet joint between said first and second shells.

3. The web of claim 1 in which said holding means comprises a hook-fit joint between said first and second shells.

4. The web of claim 1 [in which there is an aperture in said first shell between said at least two circular grooves] *wherein said first shell has an aperture between the first and second end of said first shell for permitting access to said rotor.*

5. The web of claim 1 in which said shell halves are joined by bolts.

6. The web of claim 1 further including thermocouples along the inner periphery of said first shell.

7. The web of claim 1 further including a plurality of curved partitions attached around the outer periphery of said shells to said surfaces for receiving said partitions.

8. The web and partitions of claim 7 further including outer rings attached to said curved partitions along the radially outward portions thereof.

9. The web of claim 1 in which said first and second shells are steel.

[10. An inner web of a diaphragm for use in a double flow section of a steam turbine having a rotor shaft with a plurality of bucket wheels affixed thereto, said wheels rotate about the axis of said shaft between a plurality of stationary nozzle rings formed by curved partitions, said web comprising:

a first cylindrical shell formed in two joinable halves for surrounding a portion of said rotor shaft, said first shell having at least two circular grooves along the inner periphery thereof for holding steam packing material in close proximity to said rotor shaft, said first shell also having a surface around the outer periphery of a first end thereof for attachment of curved partitions, and including a second end which is displaced along said axis from said first end;

a second cylindrical shell formed in two joinable halves, said second shell also having a surface around the outer periphery thereof for attachment of curved partitions; and means for holding said second shell in a fixed position against the second end of said first shell.]

[11. The web of claim 10 in which said holding means comprises bolts.]

[12. The web of claim 11 in which said holding means, further includes a circumferential rabbet joint.]

13. An inner web of a diaphragm for use in a double flow section of a steam turbine having a rotor shaft with a plurality of bucket wheels affixed thereto, said wheels rotate about the axis of said shaft between a plurality of stationary nozzle rings formed by curved partitions, said web comprising:

a first cylindrical shell formed in two joinable halves for surrounding a portion of said rotor shaft, [said first shell having at least two circular grooves on the inner periphery thereof for holding steam packing material in close proximity to said rotor shaft,] said first shell [also] having a surface surrounding the outer periphery of a first end thereof for attachment of curved partitions and including a second end which is axially displaced from said first end;

a second cylindrical shell formed in two joinable halves for surrounding the second end of said first shell, said second shell also having a surface around the outer periphery thereof for attachment of curved partitions; and means for joining said second shell to said first shell, said joining means permitting limited axial movement between said first and said second shell.

14. The web of claim 13 in which said [adjoining ] *joining* means comprises a rabbet joint between said first and second shells.

15. The web of claim 13 in which said joining means comprises a hook-fit joint between said first and second shells.

* * * * *